Sept. 27, 1949.　　　　　H. G. ALLEN　　　　　2,483,358
SAFETY ATTACHMENT FOR AUTOMOBILES
Filed Sept. 27, 1947
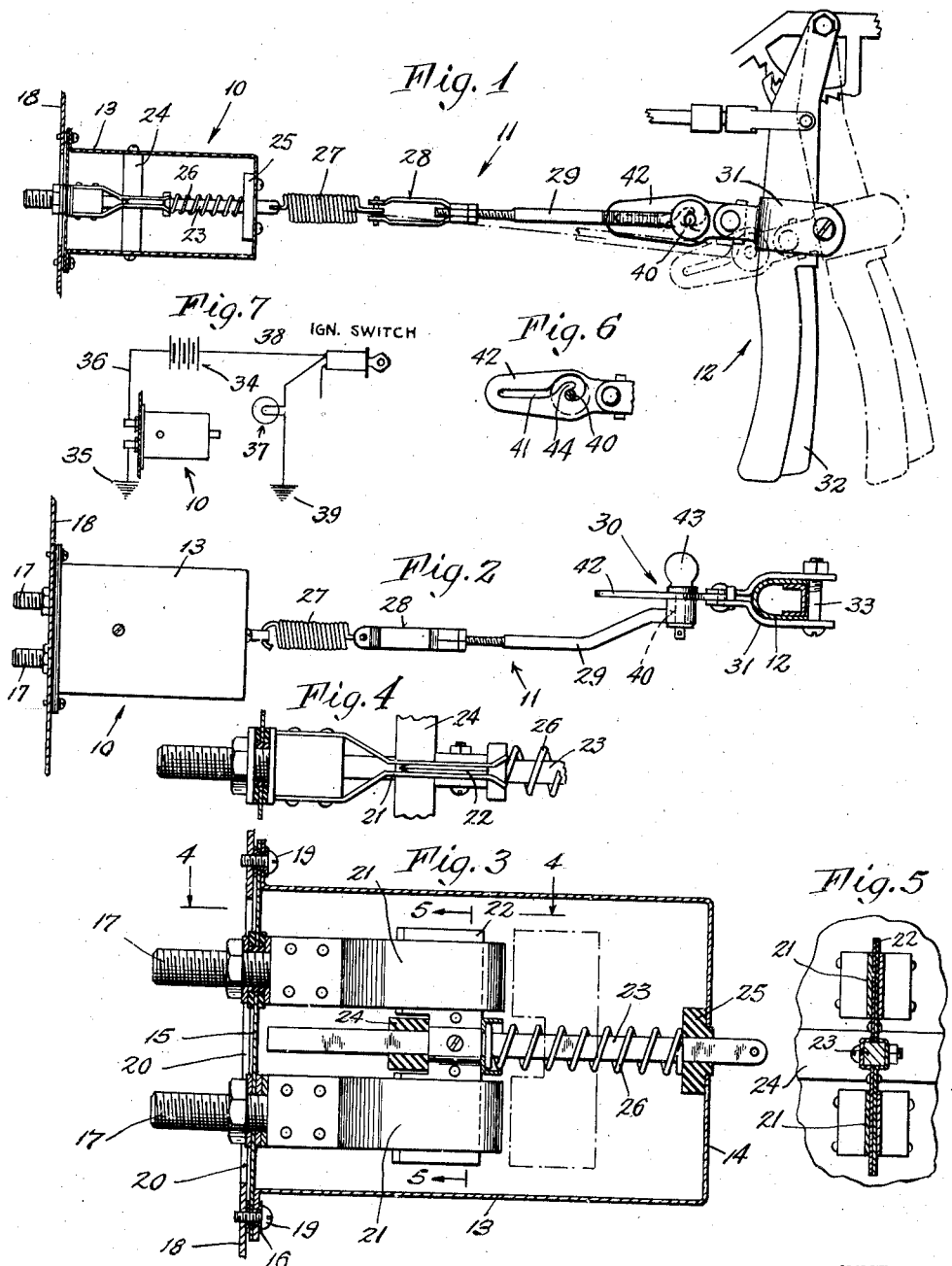
INVENTOR
*Henry G. Allen*
BY
*Johnson and Kline*
ATTORNEYS Patented Sept. 27, 1949

2,483,358

UNITED STATES PATENT OFFICE 2,483,358

SAFETY ATTACHMENT FOR AUTOMOBILES

Henry G. Allen, Bridgeport, Conn., assignor of one-half to Henry Greenstein, Bridgeport, Conn.

Application September 27, 1947, Serial No. 776,495

8 Claims. (Cl. 171—97)

This invention relates to automatically operated electric safety devices for automobiles, and more particularly to devices of this nature which are in the form of attachments and are intended for universal application to various makes of automobiles.

An object of the invention is to provide an improved electric safety attachment for an automobile which automatically opens the battery circuit, when the automobile is parked, in response to a usual operation incidental to the parking, as for example in response to the applying of the hand or parking brake, to the end that damage from a short-circuit, or inadvertent draining of the battery is prevented while the car is parked.

A further object of the invention is to provide an improved safety attachment as above, which is so arranged that it may be easily and quickly manually actuated independently of the brake handle, to reconnect the battery if such should be desired for energizing a heater, radio, lights, etc., or to supply ignition for starting while on a hill.

Another object of the invention is to provide an improved safety cut-out device for connection with a brake handle to be actuated thereby, the said device being so arranged that it is rendered operative to disconnect the battery even though the brake handle should not be in full or complete braking position, thereby minimizing the likelihood of the device being inoperative due to improper or incomplete actuation of the handle.

Yet another object of the invention is to provide a simple and effective signalling device in combination with a safety device as above, whereby the connected or disconnected condition of the battery will be indicated at all times.

A still further object of the invention is to provide an improved electric safety attachment as above, which is of extremely simple and economical construction, and is reliable in operation.

In accomplishing these objects there is provided by the invention an improved and simple mechanism comprising a heavy-duty electric switch having heavy current terminals adapted for connection in series with one power line from the automobile battery. The switch has means for mounting it on the dash of the automobile under the instrument panel, and has a novel linkage for connection to the hand brake handle of the car whereby the switch is actuated in response to movement of said handle. The linkage includes a resilient yieldable portion which enables the linkage to be longitudinally expansible, and when the brake handle is in full braking position the expansible portion of the linkage is somewhat extended. If the brake handle should, for some reason, not be fully shifted to braking position, the expansible portion of the linkage, although not extended, will still operate to actuate the switch and open the battery circuit, thereby minimizing the likelihood of the safety device being inoperative due to improper and incomplete operation of the brake handle.

A manually releasable connection is provided in the linkage between the switch and brake handle, to enable the switch to be actuated to closed position manually and independently of the brake handle and while the latter is in braking position. Therefore, if the services of the battery should be required while the automobile is parked, either for the purpose of starting the engine, playing the radio, operating the heater, etc., this may be readily and quickly accomplished.

A simple universal clamping strap is provided on the linkage for attachment to the various shapes and sizes of brake handles, and the linkage is constructed so as to be easily adjustable for length, thereby adapting the device for universal application to various makes of cars.

Other features and advantages will hereinafter appear.

In the accompanying drawings:

Figure 1 is a side elevation of the electric safety attachment of the present invention, connected with a brake handle and mounted on the dashboard of an automobile, the switch casing of the attachment being shown in section to reveal the interior parts thereof.

Fig. 2 is a top or plan view of the attachment, the brake handle being shown in horizontal section.

Fig. 3 is a top view, enlarged, of the electric switch of the attachment, the casing being shown in section.

Fig. 4 is a fragmentary view taken on line 4—4 of Fig. 3.

Fig. 5 is a sectional view taken on line 5—5 of Fig. 3.

Fig. 6 is a detail showing the manually releasable pin-and-slot connection in the linkage means of the attachment, and Fig. 7 is a schematic circuit diagram illustrating the preferred method of connecting the attachment, and signal means thereof.

Referring to Figs. 1 and 2 the improved electric safety attachment of this invention comprises a heavy-duty knife blade switch 10 and an actuating linkage 11 connected to operate the switch 10, the said linkage being attachable to the hand brake handle 12 or the like actuator for the parking or emergency brake of an automobile.

The switch 10 comprises a housing or casing 13 having opposite end walls 14 and 15, the wall 15 being secured to the rest of the casing 13 by eyelets 16 as clearly shown in Fig. 3. The end wall 15 of the casing 13 insulatedly carries a pair of terminal studs 17 which project outwardly from the wall in spaced relation and are of substantial size so as to accommodate heavy connecting wires, and so as to adequately carry heavy current. The term "heavy current" as used herein is intended to mean current on the order of that required by a starting motor of an automobile, as distinguished from the much smaller currents commonly required to operate various accessories, lights, ignition, etc.

The switch 10 may be mounted on the dash panel 18 of the automobile by screws 19 passing through the eyelets 16, the panel 18 having a large aperture 20 to provide clearance for the terminal studs 17.

Within the casing 13 the terminal studs 17 mount resilient blade-receiving contacts 21 which are cooperable with a movable knife blade contact 22, the latter being shiftable between the full line circuit-closing position of Fig. 3 and the dot-and-dash open-circuit position thereof, and being carried by an operating bar 23 which extends through the end wall 14 of the casing. The operating bar 23 passes through and bears on an insulating strut 24 and an insulating bushing 25, Figs. 1 and 3, the said strut and bushing being secured to the casing 13 by screws as shown. A compression spring 26 is carried by the operating bar 23 and normally yieldably holds the knife blade 22 in the circuit-closing position shown in Fig. 3. The spring 26 is strong enough to shift the knife blade contact 22 from the dot-and-dash open-circuit position of Fig. 3 to the closed-circuit position thereof, as will be understood.

Referring to Figs. 1 and 2 the linkage 11 comprises an extension spring 27 having one end connected to the operating bar 23 of the switch 10, the other end of the spring being connected to a turnbuckle 28 which connects with a link rod 29. The link rod 29 has a pivotal connection 30 with a strap 31 which is adapted to extend around and embrace the brake handle 12 at a point above the latch-release portion 32 thereof, the strap 31 being secured in place by a draw bolt 33.

As shown in Fig. 1, when the brake handle 12 is in brake-releasing position the knife blade contact 22 of the switch 10 is engaged by and bridging the stationary contacts 21 of the switch, thereby closing the circuit through the switch. When the brake handle 12 is in the dot-and-dash position shown in Fig. 1, it will actuate the linkage 11 to separate the knife blade contact 22 from the switch contacts 21, the knife blade 22 being maintained in the dot-and-dash position shown in Fig. 3, and the spring 26 being in a compressed state.

Referring to Fig. 7, it is preferred to interpose the switch 10 in series with the battery 34 between the ground connection 35 and the negative terminal or wire 36 of the battery. Thus, when the brake handle 12 is in braking position the negative side of the battery 34 will be disconnected, thereby making it impossible for the battery to be inadvertently drained, as by a short-circuit or by leaving an accessory turned on while the car is parked and the hand brake is in braking position. Since it is impossible for the battery to feed any current through a short-circuit which might occur or be present in the car wiring, the likelihood of such short-circuit causing fire or damage while the car is parked, is eliminated.

Preferably when the safety attachment of this invention is initially installed, the turnbuckle 28 is so adjusted that the extension spring 27 is slightly expanded when the brake handle 12 is in the dot-and-dash position shown in Fig. 1. By this construction and adjustment, the switch 10 will be in open-circuit position even though the brake handle 12 is not fully moved to braking position, thereby minimizing the likelihood of the switch not opening the battery circuit due to improper or incomplete operation of the brake handle 12.

In accordance with the invention a simple signal means is provided to indicate at all times whether or not the battery 34 is connected. This signal means may comprise a pilot bulb 37 having one terminal connected with the positive lead wire 38 from the battery 34, and having its other terminal connected to a ground 39. Whenever the switch 10 is closed the pilot bulb will be energized, and whenever the switch 10 is open the pilot bulb 37 will be extinguished.

According to the invention, the linkage 11 is provided with a manually releasable connection whereby the switch 10 may be actuated to closed position even though the brake handle 12 is in braking position. Preferably such connection is combined with the pivot connection 30. In accomplishing this, referring to Fig. 2, the end of the link rod 29 at the connection 30 is provided with a laterally extending pin 40 projecting through a slot 41 in a flat extension 42 of the bracket 31. The pin 40 carries a knob 43 which is arranged to be easily grasped and manipulated by hand. As shown in Fig. 6 a camming finger or stop 44 is provided on the extension 42 to extend into the slot 41 thereof, the slot thereby having somewhat the shape of a hook. When the pin 40 of the link rod 29 is in the position shown in Fig. 6, the linkage 11 is not extendable, and movement of the brake handle 12 from left to right as viewed in Fig. 1 will cause the switch 10 to be opened. If, when the switch handle 12 is in the dot-and-dash braking position of Fig. 1, the knob 43 is grasped and pulled to the right and also raised, the pin 40 will be shifted out of engagement with the locking finger 44 and may therefore traverse the length of the slot 41, under the expanding action of the compression spring 26 within the switch casing. This will result in the switch 10 being closed. If after such manual closing of the switch 10, the brake handle 12 should be moved from braking to releasing position, the pin 40 will automatically slide up on the camming finger 44 and again become locked by the finger as shown in Fig. 6. This organization is of considerable advantage, since it enables the services of the battery 34 to be had even though the car is parked and the brake handle 12 is in braking position. Therefore the parking lights, car radio or car heater etc. may be operated without requiring release of the hand brake. Also, if it is desired to start the car engine while the hand brake is kept on, as would be desirable when the car is parked on a hill, this may be done by actuation of the knob 43 to effect closing of the switch 10.

Variations and modifications may be made within the scope of the invention and portions of the improvements may be used without others.

I claim:

1. A safety attachment for an automobile, comprising an electric switch; means including terminals of heavy current capacity for connecting the switch in series with the battery circuit of the automobile, to open and close said circuit; and means attachable to the hand brake handle of the automobile and including a linkage for operating said switch in response to movement of the handle whereby the battery circuit is opened when the brake handle is in braking position and whereby the circuit is closed when the handle is in brake-releasing position, said linkage having a manually releasable device to enable the linkage to be extended and close the switch when the brake handle is in braking position.

2. A safety attachment for an automobile, comprising an electric switch; means including terminals of heavy current capacity for connecting the switch in series with the battery circuit of the automobile, to open and close said circuit; and means attachable to the hand brake handle of the automobile and including a linkage for operating said switch in response to movement of the handle whereby the battery circuit is opened when the brake handle is in braking position and whereby the circuit is closed when the handle is in brake-releasing position, said linkage having a manually releasable device to enable the linkage to be extended and close the switch when the brake handle is in braking position and said device being arranged for automatic resetting to shorten the linkage upon the brake handle being moved to brake-releasing position.

3. A safety attachment for an automobile, comprising an electric switch; means including terminals of heavy current capacity for connecting the switch in series with the battery circuit of the automobile, to open and close said circuit; and means attachable to the hand brake handle of the automobile and including a resilient and yieldable linkage for operating said switch in response to movement of the handle whereby the battery circuit is opened when the brake handle is in partial or full braking position and whereby the circuit is closed when the handle is in brake-releasing position, said linkage having a manually releasable device to enable the linkage to be extended and close the switch when the brake handle is in braking position and said device being arranged for automatic resetting to shorten the linkage upon the brake handle being moved to brake-releasing position.

4. A safety attachment for an automobile, comprising an electric switch; means including terminals of heavy current capacity for connecting the switch in series with the battery circuit of the automobile, to open and close said circuit; and means attachable to the hand brake handle of the automobile and including a linkage for operating said switch in response to movement of the handle whereby the battery circuit is opened when the brake handle is in braking position and whereby the circuit is closed when the handle is in brake-releasing position, said linkage having a manually releasable pin-and-slot connection to enable the linkage to be extended and close the switch when the brake handle is in braking position.

5. A safety attachment for an automobile, comprising an electric switch; means including terminals of heavy current capacity for connecting the switch in series with the battery circuit of the automobile, to open and close said circuit; and means attachable to the hand brake handle of the automobile and including a linkage for operating said switch in response to movement of the handle whereby the battery circuit is opened when the brake handle is in braking position and whereby the circuit is closed when the handle is in brake-releasing position, said linkage having a manually releasable pin-and-slot connection to enable the linkage to be extended and close the switch when the brake handle is in braking position and said connection having a camming projection extending into the slot thereof to provide for automatic resetting of the connection so as to shorten the linkage upon the brake handle being moved to brake-releasing position.

6. A safety attachment for an automobile, comprising an electric switch; means including terminals of heavy current capacity for connecting the switch in series with the battery circuit of the automobile, to open and close said circuit; and means attachable to the hand brake handle of the automobile for operating said switch in response to movement of the handle whereby the battery circuit is opened when the brake handle is in braking position and whereby the circuit is closed when the handle is in brake-releasing position, said operating means including a manually releasable connection to enable the switch to be actuated to closed-circuit position while the brake handle remains in braking position.

7. A safety attachment for an automobile, comprising an electric switch; means including terminals of heavy current capacity for connecting the switch in series with the battery circuit of the automobile, to open and close said circuit; and means attachable to the hand brake handle of the automobile for operating said switch in response to movement of the handle whereby the battery circuit is opened when the brake handle is in braking position and whereby the circuit is closed when the handle is in brake-releasing position, said operating means including a manually releasable connection to enable the switch to be actuated to closed-circuit position while the brake handle remains in braking position, said connection automatically resetting to re-establish control of the switch by the brake handle when the latter is moved from braking to brake-releasing position.

8. A safety attachment for an automobile having a parking brake and an operating mechanism for said brake, comprising a switch having terminals of heavy current capacity for connection to a source of energy and having a movable switch blade and contacts cooperable therewith, connected to said terminals; means for operating said switch blade in response to movement of said brake-operating mechanism whereby the circuit between said terminals is opened incident to the setting of the parking brake, spring means for actuating the switch blade to close the circuit upon movement of the brake-operating mechanism to release the parking brake; and manually operable means for releasing the blade from said brake-operating mechanism for movement by the spring means into closed-circuit position while the said mechanism is positioned to maintain the brakes set.

HENRY G. ALLEN.

REFERENCES CITED

The following references are of record in the file of this patent:

UNITED STATES PATENTS

| Number | Name | Date |
| --- | --- | --- |
| 1,950,194 | Samad | Mar. 6, 1934 |
| 1,995,946 | Schild | Mar. 26, 1935 |
| 2,277,671 | Williams et al. | Mar. 31, 1942 |
| 2,305,983 | Muth | Dec. 22, 1942 |